Patented May 28, 1940

2,201,981

UNITED STATES PATENT OFFICE 2,201,981

PROTECTIVE COATING

Herman L. Baron, New York, N. Y., assignor to Cladite Incorporated, a corporation of Delaware No Drawing. Application April 17, 1935, Serial No. 16,931

24 Claims. (Cl. 91—70)

This invention relates to an improved protective coating composition, the method of treating the composition after application to an object surface to form a novel coating which has a lustrous appearance and many of the properties of a continuous metallic surface, and to the cold preparing of the composition to render it free-flowing, ready for use or shipment.

For the protection of metallic surfaces against atmospheric and other corrosion, coatings of metal are widely used. The metal coating methods most commonly employed are galvanizing and tin-plating, since iron (steel) is the metal used in largest quantities. Other metal coating methods are electro-plating, coating with sprayed molten metal, sherardizing, and calorizing. The latter involves cementation of a metal surface, usually iron or copper, by means of aluminum. Paints of all kinds are also very widely used for the protection of both metallic and non-metallic surfaces and, for the purposes of this discussion, the term "paint" will be used to include metallic paints, rust-proof paints, lacquers, varnishes, japans, enamels, and the like.

Metal coatings on metal surfaces, such as galvanized, tin-plated, calorized, and molten-sprayed surfaces, are inherently flame-repellent and are substantially unaltered by unprolonged exposure to heat at temperatures just below the melting point of the coating. Metal coatings, as is well known, are unattacked by solvents of organic material such as are generally employed in paint vehicles or in paint removers.

In the case of known paints, even when finely divided metal particles are embodied and dispersed therein, the dried paint film is not flame-repellent and will not withstand, without blistering, scaling or cracking, prolonged exposure to heat at or about 500° F. (250° C.), much less a comparatively short exposure to a directly-applied flame, without burning. Moreover, a dried paint film is softened, marred, or destroyed by the application thereto of solvents of organic materials, such as hydrocarbon solvents and chlorinated hydrocarbon solvents, for example, naphtha, benzol, acetone, orthodichlorobenzene, carbon tetrachloride, and the like. Such solvents are often employed in so-called "paint removers."

In accordance with the present invention, I provide a novel coating composition comprising a solved flame-retarding organic compound, i. e., an organic compound which will not propagate flame and burn or smolder when subjected to high temperatures or direct flame in contact with air, but will be converted to a more or less infusible and insoluble mass or residue, for example, hard stearin pitch, of low penetration (of the order of 1) and high melting point (not less than of the order of 220° F.) having finely-divided, tiny, thin, flake metal particles dispersed therein, which may be cold prepared in a liquid condition of any desired viscosity, preferably free-flowing. This composition may be applied to an object surface just as readily as paints, by brushing, dipping, or spraying, etc. If the surface to be protected by my improved coating is of clean metal, such as sheet iron (steel), then the applied coating, shortly after application, preferably may be heat-treated or "set" by the direct application thereto of a flame of a temperature usually in excess of 500° F. (250° C.), such as by an oxy-acetylene torch flame, a gasoline blow-torch flame, or in a muffle. Thereupon, the novel coating will be found to have a lustrous appearance and many of the properties of a continuous metallic surface. It is flame-repellent and highly resistant to solvents of organic material such as are widely employed in paint vehicles as a solvent or diluent, or in paint removers.

If the surface to which the coating composition is applied is to be subjected in use to high temperatures, such as on the steel surfaces of locomotive smoke boxes and stacks, or on the high-pressure steam cylinders thereof, then the "setting" of the coating may be obtained solely by the heat conducted to those surfaces in the course of operation of the locomotive. It has also been found that my improved coating composition may be applied to such surfaces after the same have been properly cleaned and when hot.

A protective coating composition prepared in accordance with the present invention, especially useful for the protection of iron (steel) and like surfaces, is that obtained by dispersing tiny, flat, scale-like metallic aluminum particles (125–250 mesh), in quantity sufficient to form a continuous coating over the surface to which it is to be applied, in a mass of stearin pitch rendered free-flowing (cold) by solvents thereof, such as naphtha, benzol, orthodichlorobenzene, carbon tetrachloride, or a combination of any two or more thereof, with small quantities of talc and silica (powdered) thoroughly mixed and dispersed therein. The relative proportions of these constituent materials I have found may be varied over comparatively wide limits, depending on the nature of the object surface to which the coating is to be applied, the characteristics and appearance which it is desired the finished coating should have, and the temperature of the heat or flame treatment, if any, which the coating is to be given immediately following application, or the amount of heat to which it may be subjected thereafter in use.

The following are approximate variations in the proportion of the respective ingredients for a free-flowing composition with flake aluminum particles, per gallon of solvents:

| | | |
|---|---|---|
| Stearin pitch | lbs | ¼ to 4 |
| Naphtha or benzol | pints | 3 to 7 |
| Orthodichlorobenzene or carbon tetrachloride | pints | 1 to 5 |
| Talc (powdered) | ounces | 1 to 4 |
| Silica (powdered) | do | ½ to 3 |
| Flake aluminum particles | lbs | ½ to 5 |

After one or more thin coats of this material is applied to a clean iron or steel surface by cold spraying, as with any of the well-known types of compressed air paint atomizers, or by brushing or dipping, and it is permitted to dry, i. e., to permit volatilization of the more readily volatile solvents, the coating is ready to be "set." The "setting" operation may be performed manually and progressively over adjacent areas with the flame of an oxy-acetylene, gasoline, or other torch. The localized "setting" flame temperatures may be in excess of 300° C. (600° F.) but less than the melting point of aluminum (658.7° C.—1218° F.). Thus, during "setting," substantially all of the volatilizable and readily-combustible constituents of the composition are driven off and a difficultly-combustible, difficultly-soluble, hard, non-blistered, flexible, bonding residue, tenaciously adherent to both the object surface and the aluminum particles, is obtained. The novel coating is now repellent to flame, is highly resistant to solvents of organic material such as readily soften or remove dried paint film and the like, and has a lustrous appearance and many of the properties of a continuous aluminum metal surface. Furthermore, unlike calorized iron or steel, the aluminum particles are unalloyed with the iron under-surface.

Additional valuable characteristics of my improved coating and its novel "set" surface are that it is flexible, durable, and tough. For example, a thin sheet of iron, coated with the composition containing flake aluminum particles, will withstand one-hundred and eighty degree bending along a sharp edge without substantial cracking or scaling of the surface thereof. Then, too, the "set" lustrous surface is resistant to rubbing and may be scrubbed, cleaned and polished in much the same manner as a continuous metal surface.

It would appear that the nature of the coating obtained with my improved composition after "setting" is such that the metal flake particles are tenaciously yet flexibly retained in exposed, densely-overlapped, scale-like formation at and in the outer surface of the adherent bonding residue, as a layer. In any case, the novel coating, in addition to having a lustrous appearance and many of the properties of a continuous metallic surface, is also capable of withstanding violent changes in temperature with and on the objects to which it is applied, without buckling, loosening, cracking, scaling, etc. For example, the coefficients of expansion of iron and aluminum, respectively, are widely different, yet an iron object, such as a sheet steel test panel, to which my improved coating with flake aluminum has been applied, may be heated by a torch flame to a dull red (as indicated on an uncoated surface thereof) and then plunger into cold water, without causing any substantial change in the lustrous appearance of the surface and without loosening it or causing buckling, scaling, or cracking thereof. Likewise, carbon dioxide snow may be applied to such a coating to reduce its temperature and the object surface to which it is applied, to 0° F. and below, and a torch flame then applied, without causing loosening or cracking, scaling, or blistering of the coating.

It has been observed, in the course of performing the "setting" operation with the improved composition containing flake aluminum particles applied to iron (steel) surfaces, that the worker manipulating the torch flame obtains a helpful visual indication when a sufficient amount of heat has been applied to a limited area of coating. This indication consists in a progressive change in the appearance of the surface from one approximately like that of a surface covered with so-called aluminum paint, which presents a more or less light-diffusing appearance, to a substantially light-reflecting one, more closely resembling that presented by the smooth continuous metallic surface of a sheet of aluminum. When this smooth metallic surface appearance is presented, the heat-treatment and "setting" may be discontinued and an adjacent area may then be "set." This progressive heat-treatment of adjacent areas of the applied coating for "setting," is comparable in technique to that of applying a gasoline blow-torch flame to burn off and remove old, dried paint films from surfaces, in cleaning the same prior to re-painting.

My improved coating composition may be prepared with any of a variety of desirable finely-divided, tiny, thin, flake metal particles dispersed therein, such as flake copper, zinc, nickel and the like particles, or alloy particles containing those metals. It has been found that any metal or metal alloy capable of being formed into finely-divided, tiny, thin, flake particles, and having the required protective properties, may be used. Such coatings containing copper flake particles and copper alloy flake particles appear to be especially useful for many purposes.

It has also been found that my improved coating composition may be successfully applied to smooth glass surfaces for decorative or other purposes, and that it may be "set" by careful application of heat without causing cracking of the glass. It is interesting to note that with transparent sheet glass test panels having my coating composition applied to one side only, the formation and appearance of the adherent bonding residue during "setting" may be directly viewed therethrough. In this way, I have been able to observe the changes which occur upon "setting." When one side of a transparent glass panel is coated with my improved composition, the appearance of the under-surface of the coating directly on the glass is much the same as the apearance of the outer exposed surface of the applied composition. However, as heat is applied to the coating, that portion adhering to the glass changes in appearance. And, after the "setting" operation is completed, little if any of the metal-like appearance may be observed through the glass, since the formation of the bonding residue obscures observation and appears as a substantially continuous dark-colored, though translucent, film adherent to the glass surface. The bonding residue tenaciously retains the flake metal particles in what I have chosen to call a densely-overlapped, scale-like formation.

As to the other ingredients of my improved coating composition, it is known that stearin pitch is an organic compound possessing flame-retarding and flame-repellent characteristics and these inherent properties are undoubtedly enhanced by the presence of the metal flake particles in my (applied) improved coating composition, both during and after "setting." Other forms of flame-retarding fatty acid pitches which may also be used with more or less success are, for example, bone-fat pitch, cotton-seed-oil pitch, cotton pitch, cotton-stearin pitch, cotton-seed-foots pitch, and the flame-retarding, flame-repellent, natural elastic bitumens, including the asphaltites—gilsonite, glance pitch and grahamite, may also be used with more or less success.

All of these materials may be rendered free-flowing cold upon the addition of naphtha, benzol, ortho-dichlorobenzene, carbon tetrachloride, or a combination of any two or more thereof. Thus, my improved composition may be readily cold prepared at the location where it is to be used, or it may be prepared and then shipped in sealed containers for distant use.

The talc and silica (powdered) are added to reduce the "tack" of the solved stearin pitch or natural elastic bitumen, and, if desired, calcium carbonate (powdered) may be substituted therefor in like amount. It is also believed these inert fillers aid in contributing desirable characteristics to the "set" coating surface.

The coating composition may be completely cold prepared and the flake metal particles may be dispersed therein in any convenient way, as by thorough mixing and stirring.

It has been found that the composition prepared as described does not deteriorate upon standing in sealed containers, and that the metal particles dispersed therein do not become tarnished or lose their ability to appear lustrous upon "setting" after long periods of standing in the liquid composition. The orthodichlorobenzene appears to be particularly efficacious in increasing the concentration and leafing of the minute metal flakes at the surface of the applied coating, and retains this action even after the composition has stood for long periods. This results in a brighter finished surface.

Because of its properties, my improved coating composition may be applied on non-metallic surfaces including those which are not capable of withstanding any substantial amount of heat, and in these cases no "setting" treatment should be given. However, because of the nature of the coating obtainable with my improved composition, it lends itself to uses where an inherently flame-repellent coating is of value. Then, too, there are many uses for a coating having corrosion-proof or water-proof characteristics and, in such cases, my improved coating may be applied without subsequent heat-treatment. My improved coating composition, applied without subsequent heat-treatment, exhibits a tendency over a prolonged period of time, and with varied atmospheric temperature changes, to form a very hard and tough surface quite similar in some respects to the "set" coating, but not having the same smooth metallic-like surface appearance.

I claim:

1. The method of forming a protective coating repellent to flame, highly resistant to solvents of organic material and having a lustrous appearance and many of the properties of a continuous metallic surface, on object surfaces capable of withstanding high temperatures, which comprises applying a free-flowing composition of flame-retarding organic compound containing finely-divided, tiny, thin, flake metal particles dispersed in quantity sufficient to form a continuous coating thereof over the object surface, subjecting the applied coating to heat-treatment at temperatures of the order of 500° F. and destructive of paint films but below the melting point of the metal particles and below the destructive point of the compound, and thereby forming a non-blistered, hard yet flexible bonding residue, tenaciously adherent to the object surface and to the metal particles for retaining the flake particles in exposed, densely-overlapped, scale-like formation unalloyed with the object surface.

2. The method of forming a protective coating highly resistant to solvents of organic materials and having a lustrous appearance and many of the properties of a continuous metallic surface, on objects capable of withstanding high temperatures, which comprises applying a liquid composition of solved flame-retarding fatty acid pitch and containing finely-divided, tiny, thin, flake metal particles dispersed in quantity sufficient to form a continuous coating thereof over the object surface, and subjecting the applied coating to heat-treatment by directly-applied flame to form with said pitch a non-blistered, hard yet flexible bonding residue tenaciously adherent to the object surface and to the metal particles, for retaining the particles in exposed, densely-overlopped formation unalloyed with the object surface.

3. The method of forming a protective coating having a lustrous appearance and many of the properties of a continuous metallic surface, on object surfaces capable of withstanding high temperatures, which comprises applying a liquid composition of solved flame-retarding stearin pitch and containing finely-divided, thin, flake metal particles dispersed in quantity sufficient to form a continuous coating thereof over the object surface, and subjecting the applied coating to heat-treatment at temperatures of the order of 500° F. and destructive of paint films but below the melting point of the metal particles to form with said pitch a non-blistered, hard yet flexible bonding residue tenaciously adherent to the object surface and to the metal particles, for retaining the particles in exposed, densely-overlapped formation unalloyed with the object surface.

4. The method of forming a protective coating having a lustrous appearance and many of the properties of a continuous aluminum metal surface, on an iron surface, which comprises applying a liquid composition of flame-retarding fatty acid pitch and a solvent and containing finely-divided, thin, flake aluminum metal particles dispersed in quantity sufficient to form a continuous coating thereof over the said surface, and subjecting the applied coating to a locally-applied flame at temperatures of the order of 500° F. and destructive of paint films but below the melting point of the aluminum particles to form with said pitch a non-blistered, hard yet flexible bonding residue tenaciously adherent to the iron surface and to the aluminum particles, for retaining the said particles in exposed, densely-overlapped formation unalloyed with the iron surface.

5. The method of forming a protective coating repellent to flame, highly resistant to solvents of organic material and having a lustrous apppearance and many of the properties of a continuous metallic surface, on objects capable of withstanding high temperatures, which comprises applying a liquid composition of flame-retarding natural elastic bitumen and a solvent and containing finely-divided, tiny, thin, flake metal particles dispersed in quantity sufficient to form a continuous coating thereof over the object surface, and subjecting the applied coating to heat-treatment by directly-applied flame to form with said bitumen a non-blistered, hard yet flexible bonding residue tenaciously adherent to the object surface and to the metal particles, for retaining the particles in exposed, densely-overlapped formation unalloyed with the object surface.

6. An article covered with a hard, durable, tough and adherent non-blistered, difficultly combustible, difficultly-soluble film formed from a composition comprising an organic flame-retarding compound and finely-divided, tiny, thin, flake metal particles, with the metal particles tenaciously yet flexibly retained in exposed, densely-overlapped formation as a layer.

7. An article covered with a hard, durable, tough and adherent protective coating repellent to flame, highly resistant to solvents of organic material and having a lustrous appearance and many of the properties of a continuous metal surface, formed from a free-flowing composition comprising flame-retarding fatty acid pitch and a solvent, with finely-divided, tiny, thin, flake metal particles dispersed therein, after heat treatment at temperatures of the order of 500° F. with the metal particles in exposed, densely-overlapped formation.

8. An article covered with a flame-repellent, hard, durable, tough and adherent film formed from a composition comprising flame-retarding stearin pitch, a solvent and finely-divided, tiny, thin, aluminum metal flakes dispersed therein, after heat treatment at temperatures of the order of 500° F. with the aluminum flakes tenaciously retained in exposed, densely-overlapped formation as a layer.

9. An article covered with a flame-repellent, hard, durable, tough and adherent film, highly resistant to solvents of organic material, capable of withstanding a directly-applied flame at temperatures of the order of 500° F. and destructive of paint films without blistering or scaling, and having a lustrous appearance and many of the properties of a continuous metallic aluminum surface, formed from a liquid composition comprising solved flame-retarding stearin pitch and finely divided, tiny, thin, flake aluminum metal particles dispersed therein with the aluminum particles tenaciously retained in exposed, densely-overlapped formation as a layer.

10. The method of forming a smooth protective coating repellent to flame, highly resistant to solvents of organic material and having an appearance and many of the properties of a continuous smooth metallic surface on iron or steel smooth-object surfaces, which comprises applying a free-flowing composition of solved flame-retarding organic compound containing finely-divided, tiny, flake-like metal particles dispersed in quantity sufficient to form a continuous coating thereof over the object surface, subjecting the applied coating to heat-treatment at temperatures of the order of 500° F. and destructive of paint films but below the destructive temperature of the flame-retarding compound, and thereby forming a non-blistered, hard yet flexible bonding residue of said compound tenaciously adherent to the object surface and to the metal particles, for retaining the metal flake-like particles in exposed, densely-overlapped formation unalloyed with the object surface.

11. An article covered with a flame-repellent, hard, durable, tough and tenaciously adherent protective coating, highly resistant to solvents of organic material, capable of withstanding heat or directly-applied flame at temperatures of the order of 500° F. and destructive of paint films, without loosening, blistering or scaling, and having an appearance and many of the properties of a continuous metallic surface, said coating formed on said article with an applied, free-flowing composition of solved flame-retarding organic compound having dispersed therein finely-divided, tiny, flake-like metal particles in quantity sufficient to form a continuous coating thereof over said article, by heat or directly-applied flame, at temperatures below the melting point of the metal particles, without destroying said compound.

12. A free-flowing protective coating composition adapted, after application and setting by high temperature heat-treatment of the order of 500° F. to present a smooth, non-blistered surface highly resistant to solvents of organic materials and having an appearance and many of the properties of a continuous, smooth, metallic surface comprising, per gallon of solvents: .25 to 4 pounds of flame-retarding organic compound; ortho-dichlorobenzene 1 to 5 pints; 3 to 7 pints of other volatile solvent for said compound; and finely-divided, tiny, flake-like metal particles.

13. A protective coating composition comprising flame-retarding organic compound, lustrous, tiny, flake-like metal particles dispersed therein subject of tarnishing by said compound, and volatile solvent for said compound including ortho-dichlorobenzene, having the characteristic of substantially preventing deterioration of said lustrous condition of said metal particles after long periods of dispersed standing.

14. A protective coating composition comprising flame-retarding fatty acid pitch, lustrous, tiny, flake-like metal particles dispersed therein subject to tarnishing by said pitch, and volatile solvent for said pitch including ortho-dichlorobenzene, having the characteristic of substantially preventing deterioration of said lustrous condition of said metal particles after long periods of dispersed standing.

15. A protective coating composition comprising flame-retarding stearin pitch, lustrous, tiny, flake-like metal particles dispersed therein subject to tarnishing by said pitch, and volatile solvent for said pitch including ortho-dichlorobenzene, having the characteristic of substantially preventing deterioration of said lustrous condition of said metal particles after long periods of standing in said dispersion.

16. A protective coating composition comprising flame-retarding natural elastic bitumen, lustrous, tiny, flake-like metal particles dispersed therein subject to tarnishing by said bitumen, and volatile solvent for said bitumen including ortho-dichlorobenzene, having the characteristic of substantially preventing deterioration of said lustrous condition of said metal particles after long periods of standing in said dispersion.

17. The method of forming a smooth coating repellent to flame, highly resistant to solvents of organic material and having an appearance and many of the properties of a continuous metallic surface on object surfaces which comprises applying a liquid composition of solved flame-retarding organic compound containing finely-divided, tiny, flake-like metal particles dispersed in quantity sufficient to form a substantially continuous coating thereof over the object surface, and subjecting the applied coating to heat-treatment at temperatures of the order of 500° F. or above, but without destroying the flame-retarding compound, so as to form a non-blistered bonding residue of said compound tenaciously adherent to the object surface and to the metal particles, retaining the flake-like metal particles in exposed, densely-overlapped formation unalloyed with the object surface.

18. The method of forming a smooth coating repellent to flame, highly resistant to solvents of organic material and having an appearance and many of the properties of a continuous metallic surface on object surfaces which comprises applying a liquid composition of solved flame-retarding fatty acid pitch containing finely-divided, tiny, flake-like metal particles dispersed in quantity sufficient to form a substantially continuous coating thereof over the object surface, subjecting the applied coating to heat-treatment at temperatures of the order of 500° F. or above, but below the point at which the fatty acid pitch is destroyed, so as to form a non-blistered bonding residue of said fatty acid pitch tenaciously adherent to the object surface and to the metal particles, retaining the flake-like metal particles in exposed, densely-overlapped formation unalloyed with the object surface.

19. The method of forming a smooth protective coating repellent to flame, highly resistant to solvents of organic material and having an appearance and many of the properties of a continuous metallic surface on object surfaces which comprises applying a liquid composition of solved flame-retarding stearin pitch containing finely-divided, tiny, flake-like metal particles dispersed in quantity sufficient to form a substantially continuous coating thereof over the object surface, subjecting the applied coating to heat-treatment at temperatures of the order of 500° F. or above, but below the point at which the stearin pitch is destroyed, so as to form a non-blistered bonding residue of said stearin pitch tenaciously adherent to the object surface and to the metal particles, retaining the flake-like metal particles in exposed, densely-overlapped formation unalloyed with the object surface.

20. The method of forming a smooth coating repellent to flame, highly resistant to solvents of organic material and having an appearance and many of the properties of a continuous metallic surface on object surfaces which comprises applying a free-flowing composition of flame-retarding stearin pitch, volatile solvent therefor, and finely-divided, tiny, flake-like metal particles dispersed in quantity sufficient to form a substantially continuous coating thereof over the object surface, and subjecting the applied coating to heat-treatment sufficient to form with said pitch a non-blistered, hard yet flexible bonding residue resistant to solvents of organic material and tenaciously adherent to the object surface and to the metal particles, retaining the flake-like metal particles in exposed, densely-overlapped formation unalloyed with the object surface.

21. The method of forming a smooth coating repellent to flame, highly resistant to solvents of organic material and having an appearance and many of the properties of a continuous metallic surface on object surfaces which comprises applying a thin coating of a free-flowing composition of flame-retarding stearin pitch, volatile solvent therefor including ortho-dichlorobenzene, and finely-divided, tiny, flake-like metal particles dispersed in quantity sufficient to form a substantially continuous coating thereof over the object surface, allowing the applied coating to dry, and subjecting the dried coating to heat treatment at temperatures of the order of 500° F. or above, but below the melting point of the metal particles and without destroying the stearin pitch, so as to form a non-blistered, hard yet flexible bonding residue tenaciously adherent to the object surface and to the metal particles, retaining the particles in exposed, densely-overlapped formation unalloyed with the object surface.

22. The method of forming a smooth protective coating repellent to flame, highly resistant to solvents of organic material and having an appearance and many of the properties of a continuous metallic surface on object surfaces which comprises applying a thin coating of a free-flowing composition of flame-retarding stearin pitch, volatile solvent therefor including ortho-dichlorobenzene, and finely-divided, tiny, flake-like metal particles dispersed in quantity sufficient to form a substantially continuous coating thereof over the object surface, allowing the applied coating to dry, and subjecting the applied coating to heat treatment by directly-applied flame so as to form with said pitch a non-blistered, hard yet flevible bonding residue tenaciously adherent to the object surface and to the metal particles, retaining the particles in exposed, densely-overlapped formation unalloyed with the object surface.

23. An article covered with a hard, durable, tough, heat-resistant, non-blistered and adherent film, highly resistant to solvents of organic material, comprising a non-blistered, hard yet flexible bonding residue of a thin coating of flame-retarding fatty acid pitch after heat treatment at temperatures of the order of 500° F. or above, and tiny, flake-like metal particles tenaciously retained by said residue in exposed densely-overlapped formation unalloyed with the underlying surface of the article.

24. An article covered with a hard, durable, tough, heat-resistant, non-blistered and adherent film, highly resistant to solvents or organic material, comprising a non-blistered, hard yet flexible bonding residue of a thin coating of flame-retarding stearing pitch after heat treatment at temperatures of the order of 500° F. or above, and tiny, flake-like metal particles tenaciously retained by said residue in exposed densely-overlapped formation unalloyed with the underlying surface of the article.

HERMAN L. BARON.